United States Patent [19]

Rhee

[11] Patent Number: 5,325,183

[45] Date of Patent: Jun. 28, 1994

[54] OSD CIRCUIT FOR DISPLAYING ADVERTISING PICTURE DATA

[75] Inventor: Pil G. Rhee, Seoul, Rep. of Korea

[73] Assignee: Samsung Co., Ltd., Seoul, Rep. of Korea

[21] Appl. No.: 931,186

[22] Filed: Aug. 17, 1992

[30] Foreign Application Priority Data

Feb. 29, 1992 [KR] Rep. of Korea .................. 92-3372

[51] Int. Cl.$^5$ .............................................. G04N 9/44
[52] U.S. Cl. .................................. 348/528; 348/500; 348/649
[58] Field of Search .................. 358/21 R, 22, 148, 17, 358/28, 29, 29 C, 41, 149, 183, 10; 340/721, 734, 750, 814; H04N 9/73, 9/73 C, 9/44

[56] References Cited

U.S. PATENT DOCUMENTS

| | | | |
|---|---|---|---|
| 4,170,023 | 10/1979 | Tamakoshi et al. | 358/19 |
| 4,455,554 | 6/1984 | Denke | 340/721 |
| 4,507,683 | 3/1985 | Griesshaber et al. | 358/183 |
| 4,746,980 | 5/1988 | Petersen | 358/22 |
| 4,821,102 | 4/1989 | Ichikawa et al. | 358/183 |
| 4,951,126 | 8/1990 | Ohta | 358/22 |
| 5,065,346 | 11/1991 | Kawai et al. | 358/183 |
| 5,072,214 | 12/1991 | Dellinger et al. | 340/734 |

FOREIGN PATENT DOCUMENTS 0112887  5/1989  Japan .................. H04N 9/73 C

Primary Examiner—Mark R. Powell
Assistant Examiner—Jeffrey S. Murrell
Attorney, Agent, or Firm—Skjerven, Morrill, MacPherson, Franklin & Friel

[57] ABSTRACT

An OSD circuit for displaying advertising picture data on the screen of a television receiver is disclosed, and the circuit includes: an oscillator, a first counter, a second counter, a third counter, an F/F circuit, a ROM, and automatic color adjusting circuitry. The oscillator supplies clock signals to the first counter, and the first and second counters supplies horizontal and vertical scanning addresses to the ROM so as for the advertising picture data to be outputted from the ROM. The third counter, supplies a delay signal for displaying of an advertising picture data of a picture scene at a time, thereby inhibiting the output of the ROM for a certain period of time. The F/F circuit prevents a dual display of the advertising picture on the screen, and the ROM stores the advertising picture data separately for main color data, first sub-color data, second sub-color data and brightness data. The automatic color adjusting circuitry receives the advertising data consisting of the main color data, the first sub-color data and the second sub-color data from the ROM, and supplies an advertising picture having a color definitely contrasting to the color of the picture of the currently broadcasting program. If the OSD circuit of the present invention is applied to television receivers, not only advertising picture data can be continuously displayed for a certain period of time in a successive manner, but also a clear and harmonized picture color can be obtained.

3 Claims, 3 Drawing Sheets

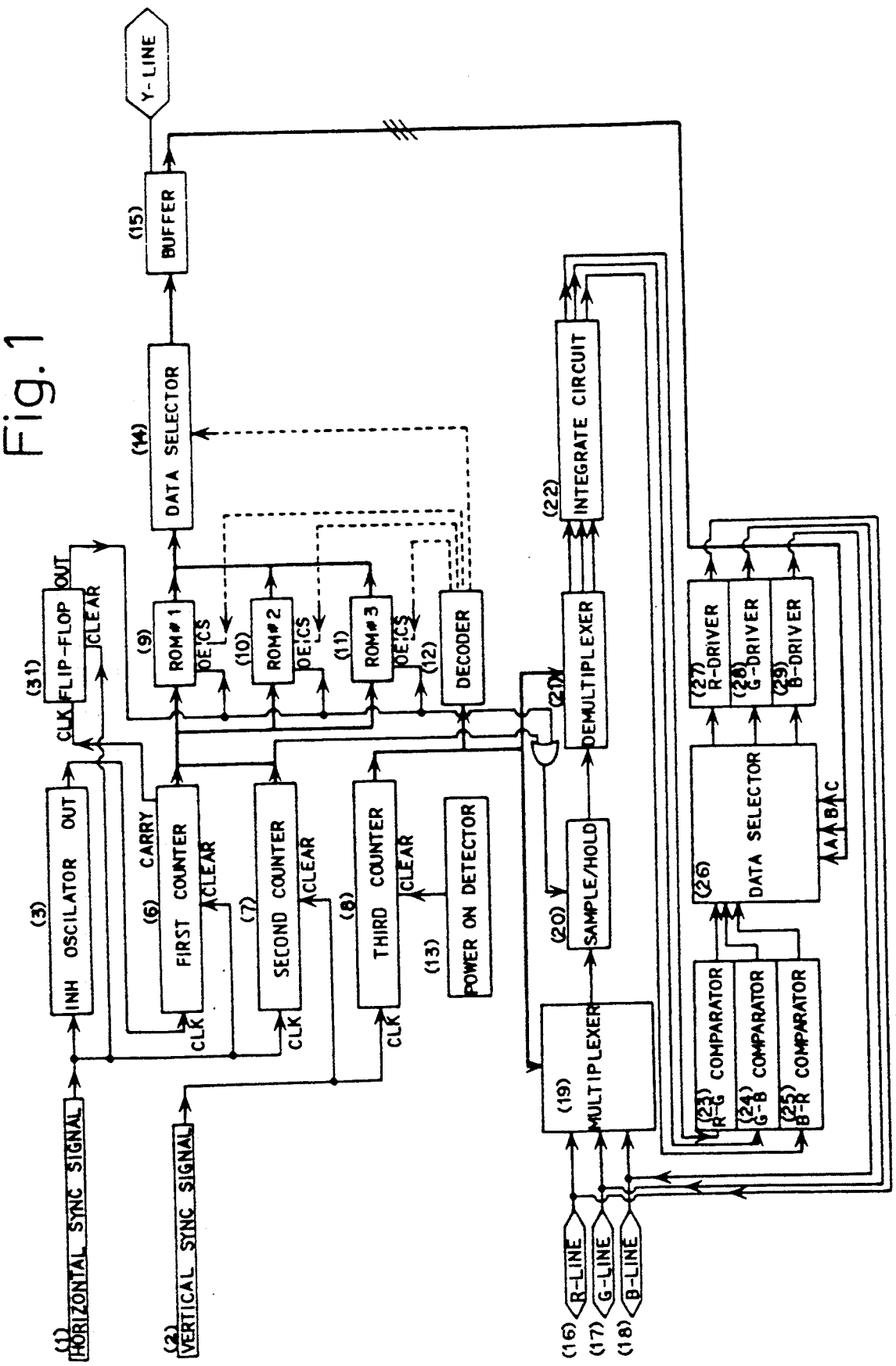

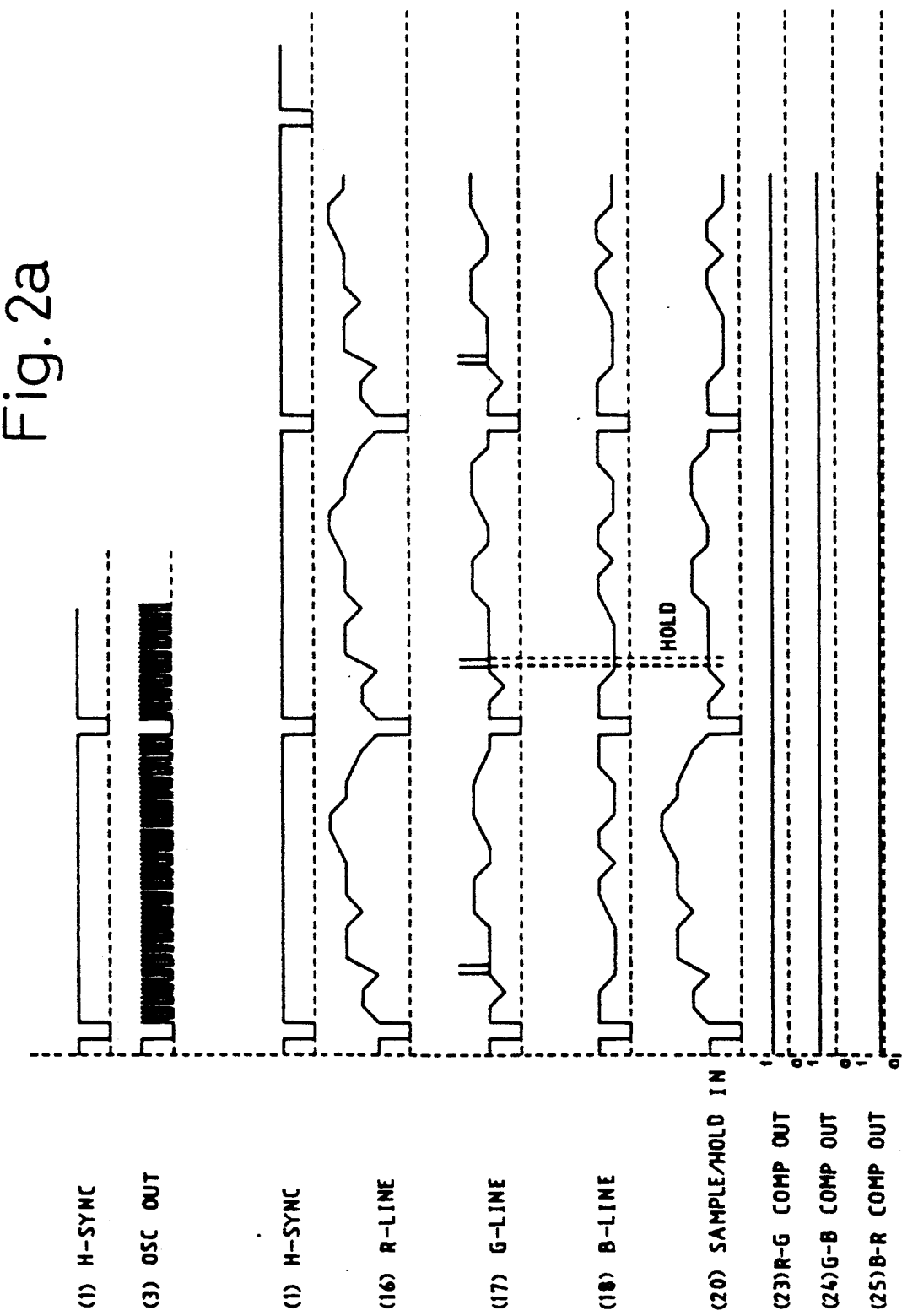

OSD CIRCUIT FOR DISPLAYING ADVERTISING PICTURE DATA

FIELD OF THE INVENTION

The present invention relates to an OSD (on-screen display) circuit for displaying advertising picture data on the screen of a television receiver, and particularly to an advertising data displaying circuit in which an advertising data continuously and successively appears on a part of the screen of a television receiver together with the picture of the broadcasting program in order to give a high advertising effect.

BACKGROUND OF THE INVENTION

Conventionally, there has been developed an OSD type television receiver which is capable of displaying special data (such as the selected channel number, sound volume, current time and the like) in the form of an OSD picture on a part of the screen in addition to the picture of the currently broadcasting program. However, such OSD data can be displayed or erased as desired by the watching person, and the color of the OSD picture is limited to a mono color font data.

SUMMARY OF THE INVENTION

Therefore it is the object of the present invention to provide an OSD circuit for displaying advertising picture data, in which it is possible to continuously and successively display advertising picture data of various colors and a complicated design in the form of an OSD picture on a part of the screen of a television receiver, and the OSD picture cannot be erased by the user as desired, the color of the OSD picture being made to be contrasting to the color of the picture of the broadcasting program.

In achieving the above object, the OSD circuit according to the present invention includes: an oscillating means for supplying clock signals to a first counter means; first and second counter means for supplying horizontal and vertical scanning addresses so as for an advertising picture data to be outputted from a ROM; a third counter means for holding the advertising picture data so as for the next data not to be outputted from the ROM for a certain period of time, by outputting to the ROM a delay signal corresponding to displaying an advertising picture scene; an F/F (flip-flop) circuit for preventing a dual display of the advertising data; a ROM for storing the advertising data separately for main color data, first sub-color data, second sub-color data and brightness data; and an automatic color adjusting means for adjusting the color of the advertising picture data to one definitely contrasting to the color of the picture of the currently broadcasting program, after receipt of the advertising data consisting of main color data, first sub-color data, and second sub-color data.

BRIEF DESCRIPTION OF THE DRAWINGS

The above object and other advantages of the present invention will become more apparent by describing in detail the preferred embodiment of the present invention with reference to the attached drawings in which:

FIG. 1 is a block diagram showing the constitution of the OSD circuit for displaying advertising picture data according to the present invention; and FIGS. 2a and 2b illustrate wave patterns of the signals outputted from the respective blocks of FIG. 1.

DESCRIPTION OF THE PREFERRED EMBODIMENT

Figure 2B:
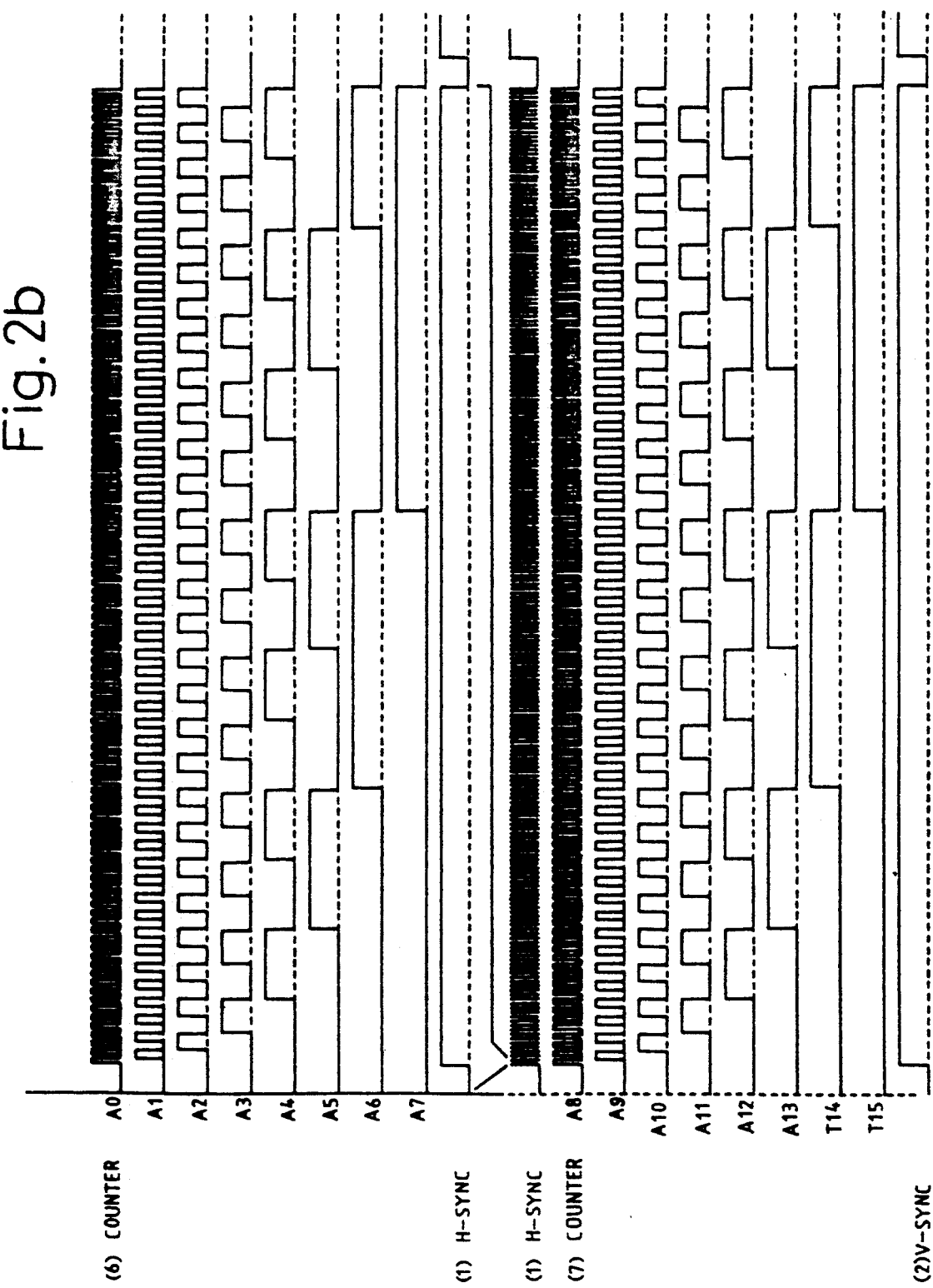

As shown in FIG. 1, the OSD circuit for displaying advertising picture data according to the present invention includes: an oscillator 3; a first counter 6; a second counter 7; a third counter 8; an F/F (flip-flop) circuit 31; ROMs 9, 10 and 11; and an automatic color adjusting means.

The oscillator 3 receives horizontal synchronizing signals 1 from among television video signals, and then, performs oscillations to supply clock signals to the first counter 6, after making the clock signals synchronized with the horizontal synchronizing signals.

The first counter 6 generates horizontal scanning addresses and supplies them to the ROMs 9, 10 and 11 for horizontally scanning the advertising data after receipt of the clock signals from the oscillator 3. Then the first counter 6 is cleared upon receipt of a next horizontal synchronizing signal, so that the horizontal scanning address should return to the initial value.

The second counter 7 generates vertical scanning addresses to supply them to the ROMs 9, 10 and 11 after receipt of the horizontal synchronizing signals (in the form of clock signals) and by counting them. Then the second counter 7 is cleared upon receipt of a next vertical synchronizing signal 2, so that the vertical scanning address should return to the initial value.

The third counter 8 generates delay signals for displaying an advertising data block of a picture scene for a certain period of time, by receiving and counting the vertical synchronizing signals in the form of clock signals. Further, the third counter 8 supplies delay signals through a decoder 12 to the ROMs 9, 10 and 11, so that the ROMs 9, 10 and 11 should output the same advertising data groups for a certain period of time. Further, the third counter 8 is cleared upon receipt of a power-on signal from a power-on detector 13, so that the decoder 12 should be always able to select the ROMs 9, 10 and 11 always in the same order.

The F/F circuit 31 supplies carry signals of the first counter 6 to disable the ROMs 9, 10 and 11, so that the dual display of the advertising data due to an address overflow of the first counter 6 should be prevented.

The ROMs 9, 10 and 11 store the advertising data separately for main color data, first sub-color data, second sub-color data and brightness signal data.

The automatic color adjusting means receives advertising data consisting of main color data, first sub-color data and second sub-color data through a buffer 15 from the ROMs 10 and 11, and then, carries out color adjustments in such a manner that the color of the advertising data should be definitely contrasting with the color of the currently broadcasting program.

The automatic color adjusting means further includes: a multiplexer 19, a sample/hold circuit 20, an integrating circuit 22, R-G, G-B and B-R comparators 23, 24 and 25, and a data selector 26.

The multiplexer 19 selects one at a time from among R (red), G (green) and B (blue) video signals of R, G and B lines 16, 17 and 18 under the control of the delay signals of the third counter 8, and supplies the selected signals to the sample/hold circuit 20.

The sample/hold circuit 20 samples out a plurality of sets of signals from among the R, G and B signals as required for the picture data after receipt of the R, G and B signals from the multiplexer 19 in a successive manner. The sample/hold circuit 20 sends the sampled signals through a demultiplexer 21 to the integrating circuit 22. Further, the sample/hold circuit 20 receives a hold signals which is formed by the sum addition of a blank signal of the second counter 7 and an OE signal of the F/F circuit 31, so that the advertising picture data which are outputted through the R, G and B lines should not be read during the sampling.

The integrating circuit 22 extracts R, G and B average value signals from among the R, G and B sampled data groups which are received through the demultiplexer 21.

The R-G, G-B and B-R comparators 23, 24 and 25 respectively compare the magnitudes of the R, G and B signals after extraction of them from the picture signals for the peripheral portions of the advertising picture. Then the comparators 23, 24 and 25 supply the compared data to the data selector 26.

The data selector 26 combines the advertising picture data supplied from the buffer 15, based on the compared results of the comparators 23, 24 and 25. Then the data selector 26 forms an advertising picture data of a clear and harmonized color which is definitely contrasting to the color of the currently broadcasting program. Then the data selector 26 supplies the mentioned data through R, G and B driving circuits 27, 28 and 29 to the R, G and B lines 16, 17 and 18, so that the data should be displayed in the form of an OSD picture.

The circuit of the present invention constituted as above will now be described as to its operations.

First, by using the horizontal synchronizing signals 1 as inhibiting signals, the oscillator 3 operates in such a manner as to output its output in synchronization with the horizontal synchronizing signals.

Then the first counter 6 is set to count using the output signals of the oscillator 3 as clock signals, and the outputs of the first counter 6 are used as the horizontal scanning addresses for the ROMs 9, 10 and 11. By using the horizontal synchronizing signals 1 as clock signals, the second counter 7 is let to count, so as for the outputs of the second counter 7 to be used as the vertical scanning addresses for the ROMs 9, 10 and 11. Under this condition, when a next horizontal synchronizing signal 1 is inputted, the first counter 6 is cleared, so that the horizontal scanning address should return to the initial value. Meanwhile, if a vertical synchronizing signal 2 is inputted, the second counter 7 is cleared, so that the vertical scanning address should return to the initial value. Then the count of the ROM addresses for the portion of one picture scene is terminated, and the count of a next picture portion is started.

Further, the third counter 8 is let to count using the vertical synchronizing signals 2 as clock signals to generate delay signals, so that an advertising picture block of one picture scene should be made to appear on the screen of a television receiver for a certain period of time. The delay signal is supplied through the decoder 12 to the ROMs 9, 10 and 11, so that the next picture data should not be outputted from the ROMs 9, 10 and 11. The decoder 12 controls the output enable signals of the ROM 9, 10 and 11 by utilizing the output signals of the third counter 8. The third counter 8 is cleared by the power-on detecting signals of the power-on detector 13, and therefore, the ROMs 9, 10 and 11 are always selected in a successive manner.

Meanwhile, if a carry signal is generated from the first counter 6 at the time point when the horizontal scanning of a first round is terminated, the ROMs 9,10 and 11 are disabled by the F/F circuit 31 which uses the carry signals as clock signals. Consequently, there is prevented a dual display of the advertising data caused by an address overflow of the first counter 6, so that another advertising picture should not be displayed at another place on the screen.

If the output data of the ROMs 9, 10 and 11 consists of 8 bits, the data of the actual advertising picture consists of 4 bits. Therefore, if the data is divided into upper 4 bits and lower 4 bits by means of the data selector 14, and if the data are sent to the buffer 15 by 4 bits and 4 bits, then the memory spaces of the ROMs 9, 10 and 11 can be saved.

The advertising data outputted in the above described manner is converted into a color which is definitely contrasting to the color of the picture of the currently broadcasting program. These converted data are outputted through the R, G and B driving circuits 27, 28 and 29 to the R, G and B lines 16, 17 and 18, before being displayed on the relevant portion of the television screen.

Now the operation of the automatic color adjusting circuit will be described further.

First, the multiplexer 19 receives R, G and B signals of the picture data of the currently broadcasting program through the R, G and B lines 16, 17 and 18 respectively, and selects signals one by one from the R, G and B signals to output them to the sample/hold circuit 20 under the control of the third counter 8.

The sample/hold circuit 20 receives the R, G and B signals from the multiplexer 19 in a sequential manner, and carries out a plurality of required samplings from the R, G and B signals of the picture data to output them through the demultiplexer 21 to the integrating circuit 22. Further, the sample/hold circuit 20 receives hold signals which are formed by the sum addition of blank signals of the second counter 7 and OE signals of the F/F circuit 31, so that the advertising picture data should not be read during the sampling.

From the R, G and B data groups which are selected in the above described manner, average value signals are extracted by the integrating circuit 22.

The R-G, G-B and B-R comparators 23, 24 and 25 compare the R, G and B average value signals after receipt of them from the integrating circuit 22, and the result of the comparisons are outputted to the data selector 26.

For example, the output data after the comparisons of the R-G, G-B and B-R colors are as shown in the following table.

| R < G | G < B | B < R | Magnitudes of R, G and B signals |
|---|---|---|---|
| 0 | 0 | 1 | R > G > B |
| 0 | 1 | 0 | B > R > G |
| 0 | 1 | 1 | R > B > G |
| 1 | 0 | 0 | G > B > R |
| 1 | 0 | 1 | G > R > B |
| 1 | 1 | 0 | B > G > R |

In the above table, the values under the heading of R<G, G<B and B<R are the output values of the R-G, G-B and B-R comparators.

Based on the compared results of the comparators 23, 24 and 25, the data selector 26 combines the output signals of the R-G, G-B and B-R comparators 23, 24 and 25 with the main color signals, the first sub-color signals and the second sub-color signals. Then the data selector 26 selects one from among the R, G and B lines in order to output the main color signals, the first sub-color signals or the second sub-color signals. Thus the color which is most contrasting to the color of the currently broadcasting program is outputted through the R, G and B driving circuits 27, 28 and 29 to the R, G and B lines 16, 17 and 18.

As an example, the data selector 26 is formed by using a logic array based on the following table and formulas.

| R < G | G < B | B < R | R out | G out | B out |
|-------|-------|-------|-------|-------|-------|
| 0 | 0 | 1 | C | B | A |
| 0 | 1 | 0 | B | A | C |
| 0 | 1 | 1 | C | A | B |
| 1 | 0 | 0 | A | C | B |
| 1 | 0 | 1 | B | C | A |
| 1 | 1 | 0 | A | B | C |

$$R\ out = A \& [(R < G \& \overline{G < B} \& \overline{B < R}) + (R < G \& G < B \& \overline{B < R})]$$
$$+ B \& [(\overline{R < G} \& G < B \& \overline{B < R}) + (\overline{R < G} \& \overline{G < B} \& B < R)]$$
$$+ C \& [(\overline{R < G} \& G < B \& B < R) + (R < G \& G < B \& B < R)]$$
$$G\ out = A \& [(\overline{R < G} \& G < B \& \overline{B < R}) + (\overline{R < G} \& G < B \& B < R)]$$
$$+ B \& [(\overline{R < G} \& \overline{G < B} \& B < R) + (R < G \& G < B \& \overline{B < R})]$$
$$+ C \& [(R < G \& G < B \& \overline{B < R}) + (R < G \& G < B \& B < R)]$$
$$B\ out = A \& [(\overline{R < G} \& \overline{G < B} \& B < R) + (R < G \& \overline{G < B} \& B < R)]$$
$$+ B \& [(\overline{R < G} \& G < B \& B < R) + (R < G \& \overline{G < B} \& \overline{B < R})]$$
$$+ C \& [(\overline{R < G} \& G < B \& B < R) + (R < G \& G < B \& \overline{B < R})]$$

In the above table and formulas, the symbols represent as follows:

R<G: output value of the R-G comparator 23;
G<B: output value of the G-B comparator 24;
B<R: output value of the B-R comparator 25;
A: value of the main color data supplied from the ROM
B: value of the first sub-color data supplied from the ROM;
C: value of the second sub-color data supplied from the ROM;
R out: values of R signals outputted to the R driving circuit;
G out: values of the G signals outputted to the G driving circuit;
B out: values of B signals Outputted to the B driving circuit.

Therefore, there can be formed an advertising on-screen display having colors definitely contrasting to the peripheral colors of the picture of the currently broadcasting program.

If the OSD circuit for displaying advertising picture data according to the present invention as described above is applied to a television receiver, not only the advertising picture data can be successively and continuously displayed for a certain period of time on a proper place of the screen, but also the color of the advertising picture can be automatically adjusted in such a manner as to be contrasted from and harmonized with the peripheral colors of the picture of the currently broadcasting program. Therefore, if a television receiver with the OSD circuit of the present invention employed is installed for displaying advertisements in public areas such as hotels, railway stations, express bus terminals and the like, high advertising effects can be obtained with low costs.

Further, the OSD circuit of displaying advertising pictures according to the present invention can be applied to all kinds of picture displaying apparatuses including VCR (video cassette recorder), LDP (laser disc player) and the like.

What is claimed is:

1. An OSD circuit for displaying picture data on the screen of a television receiver, comprising:
   a signal generator for generating signals synchronized with horizontal synchronizing signals from a received video signal, and for supplying the generated signals as clock signals to a first counter;
   said first counter generating horizontal scanning addresses to memories by counting said clock signals, and being cleared upon receipt of a subsequent horizontal synchronizing signal so the horizontal scanning address returns to its initial value;
   a second counter for generating vertical scanning addresses by counting said horizontal synchronizing signals in order to supply them to said memories, and being cleared upon receipt of a vertical synchronizing signal of said received video signal so the vertical scanning address returns to its initial value;
   a third counter for generating delay signals required for displaying a data block of one picture scene for a particular period of time on the screen by counting the vertical synchronizing signals, and for supplying the delay signals to said memories thereby causing said memories to output the data block;
   said third counter being cleared upon receipt of a power-on signal to select said memories in a predetermined sequence, and thereby causing data block data to be output in a predetermined sequence;
   a flip-flop circuit for generating disabling signals to said memories in response to carry signals after receipt of the carry signals form said first counter to prevent a dual display of the picture data; and
   an automatic color adjuster for selecting picture data from said memories contrasting to the colors of the picture of the currently received video signal;
   wherein said memories store said picture data separately as main color data, first sub-color data, second sub-color data, and brightness data.

2. The OSD circuit as claimed in claim 1, wherein said automatic color adjuster comprises:
   a multiplexer for selecting signals one-by-one from R, G and B signals of said received video signals through R, G and B lines under control of the delay signals of said third counter, in order to supply them to a sample/hold circuit;
   said sample/hold circuit sampling the R, G and B signals after receipt from said multiplexer in order to send the sampled signals to an integrator;
   said sample/hold circuit holding the picture data being sent to said R, G and B lines so the data is not read during the sampling upon receipt of a hold signal, said hold signal being formed by a sum of a blanking signal form said second counter and a signal from said flip-flop circuit;
   said integrator extracting R, G and B average value signals from the sampled signals;
   R-G, G-B and B-R comparators for comparing magnitudes of the R, G, and B extracted average value signals, and for outputting the compared data to a data selector;
   said data selector combining the compared data from said comparators; and
   said data selector sending the combined picture data to said R, G and B lines, thereby having clear and harmonized colors contrasting to the colors of the picture of said received video signal, and thereby forming an OSD picture.

3. The OSD circuit data as claimed in claim 5, wherein said data selector comprises a logic array defining logic formulas for the R, G and B color data of the picture data specified as:

$$R_{out} = A \& ((R<G \& \overline{G<B} \& \overline{B<R}) + (R<G \& G<B \& \overline{B<R}))$$
$$+ B \& ((\overline{R<G} \& G<B \& \overline{B<R}) + (R<G \& \overline{G<B} \& B<R))$$
$$+ C \& ((\overline{R<G} \& \overline{G<B} \& B<R) + (\overline{R<G} \& G<B \& B<R))$$
$$G_{out} = A \& ((\overline{R<G} \& G<B \& \overline{B<R}) + (\overline{R<G} \& G<B \& B<R))$$
$$+ B \& ((\overline{R<G} \& \overline{G<B} \& B<R) + (R<G \& G<B \& \overline{B<R}))$$
$$+ C \& ((R<G \& \overline{G<B} \& \overline{B<R}) + (R<G \& \overline{G<B} \& B<R))$$
$$B_{out} = A \& ((\overline{R<G} \& \overline{G<B} \& B<R) + (R<G \& \overline{G<B} \& B<R))$$
$$+ B \& ((\overline{R<G} \& G<B \& B<R) + (R<G \& G<B \& \overline{B<R}))$$
$$+ C \& ((\overline{R<G} \& G<B \& \overline{B<R}) + (R<G \& G<B \& \overline{B<R}))$$

where
 R<G is the output value of said R-G comparator;
 G<B is the output value of said G-B comparator;
 B<R is the output value of said B-R comparator;
 A is the value of the main color data supplied from said memories;
 B is the value of the first sub-color data supplied from said memories;
 C is the value of the second color data supplied from said memories;
 R out is the values of the R signals outputted to said R line;
 G out is the values of the G signals outputted to said G line; and
 B out is the values of the B signals outputted to said B line.

* * * * *